June 16, 1942. E. G. GALLAGHER 2,286,185
GENERATING SYSTEM FOR CONSTANT VOLTAGE AT VARIABLE SPEED OF PRIME MOVER
Filed May 29, 1940 3 Sheets-Sheet 1

INVENTOR
EDWARD G. GALLAGHER
BY Chapin & Neal
ATTORNEYS

June 16, 1942.  E. G. GALLAGHER  2,286,185
GENERATING SYSTEM FOR CONSTANT VOLTAGE AT VARIABLE SPEED OF PRIME MOVER
Filed May 29, 1940  3 Sheets-Sheet 2

INVENTOR
EDWARD G. GALLAGHER
BY Chapin + Neal
ATTORNEYS

June 16, 1942.   E. G. GALLAGHER   2,286,185
GENERATING SYSTEM FOR CONSTANT VOLTAGE AT VARIABLE SPEED OF PRIME MOVER
Filed May 29, 1940   3 Sheets-Sheet 3
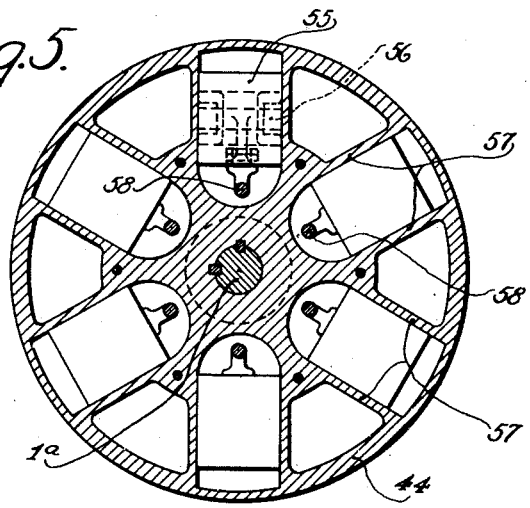
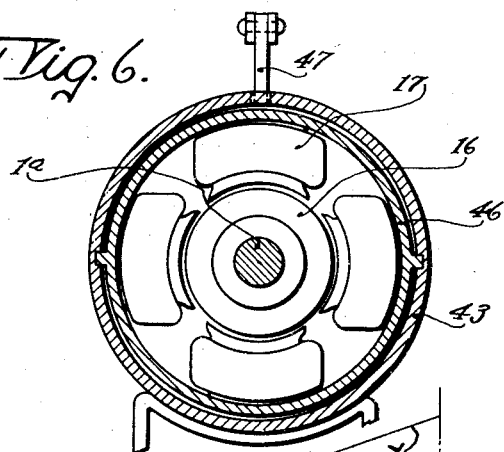
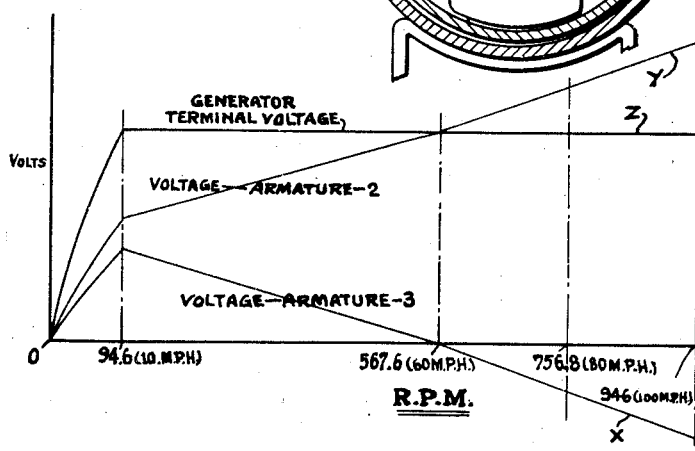
INVENTOR
EDWARD G. GALLAGHER
BY Chapin & Neal
ATTORNEYS Patented June 16, 1942

2,286,185

UNITED STATES PATENT OFFICE 2,286,185

GENERATING SYSTEM FOR CONSTANT VOLTAGE AT VARIABLE SPEED OF PRIME MOVER

Edward G. Gallagher, Florence, Mass., assignor to Edward Corbett, Chicago, Ill.

Application May 29, 1940, Serial No. 337,776

10 Claims. (Cl. 171—225)

This invention relates to an electrical generating system designed to give current at an approximately constant potential at varying speeds of the prime mover and has for its object the improvement in efficiency, economy in operation, and increased reliability of such apparatus.

The invention will find useful application in car lighting systems of railways, and the embodiment herein illustrated is particularly adapted to such a purpose. However, its general field of utility is of far greater scope than the particular example mentioned and with obvious modifications of the form herein shown the invention will be found useful in all situations wherein it is desirable to translate a variable speed of a prime mover into electrical current at approximately constant pressures.

For carrying out the purposes of the invention I have provided a generator with a plurality of armatures, viz. two or more, depending on the range of speed variation in the prime mover, and to what extent it is desirable to divide up said total range into speed brackets for which each armature or different combination of said armatures may be suitably rated. The several armatures are rotated from a common shaft preferably as a single rotor, and are connected in series so that the potentials at the terminals of the generator are at all times the algebraic sum of the potentials from the several armatures. Each armature of the series has its own individual excitation field and the field windings thereof are so proportioned and designed and arranged to be so energized that throughout all variations of speed of the prime mover the algebraic sum of the generated potentials in the system will be approximately constant.

Referring to the drawings for a brief description of the several figures:

Fig. 5 is a sectional view (enlarged) taken along line 5—5 of Fig. 3 to show the guiding pockets for the governor weights;

Figure 1:
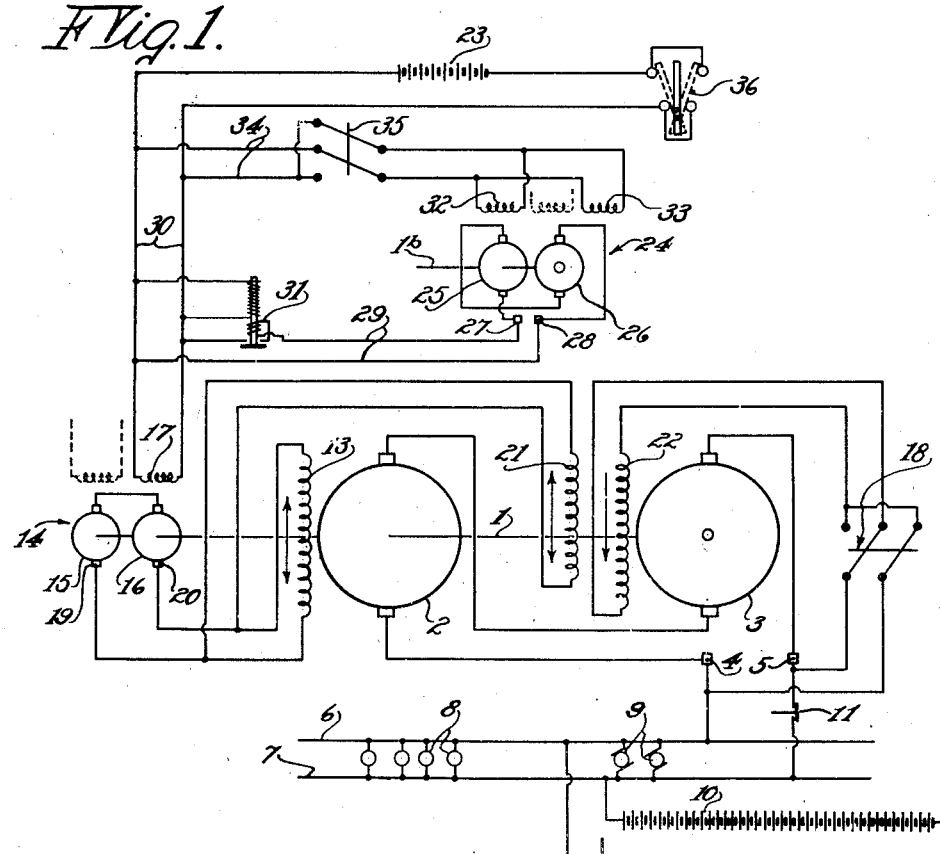
Fig. 1 is a conventionally illustrated form of a complete electrical generating system employing two armatures in the main generator.
Figure 3:
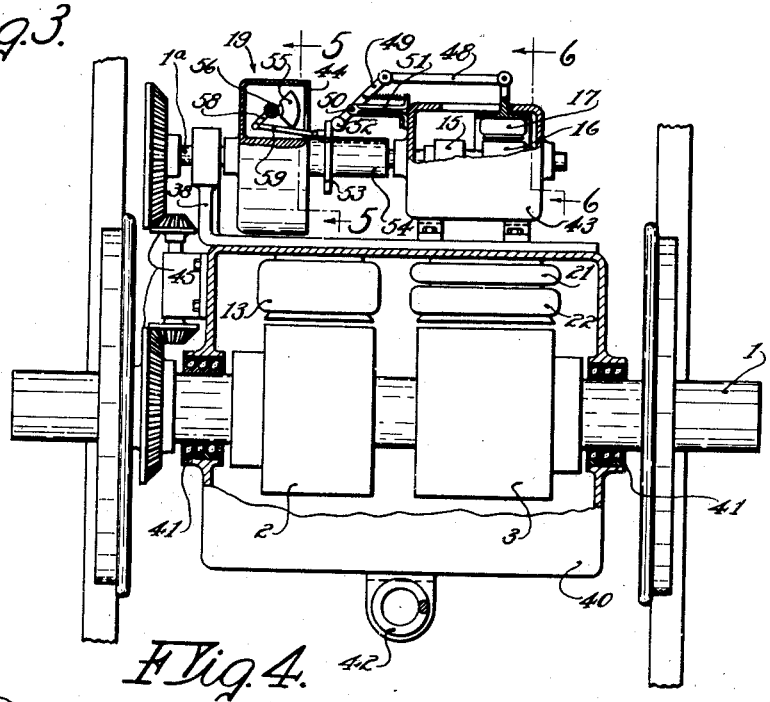
Fig. 3 illustrates a preferred form of apparatus embodying the invention designed for operation from a car axle. This view is taken from above and shows some of the parts in section.

Fig. 6 is a sectional view (enlarged) along line 6—6 of Fig. 3 to show the shifting field poles and windings of the main exciter generator; and Fig. 7 is a diagram of curves showing the voltages of the two different armatures in Fig. 1 and the resultant voltage of the generator plotted against the rotational speeds or R. P. M. of the prime mover or car axle.

I will first describe the system with reference to the diagrammatic views. Referring to Fig. 1, the prime mover such as the rotating car axle of a train is indicated at 1. Mounted on this axle to rotate therewith are the armatures 2 and 3 of the main generator. These armatures are connected in series as shown and to main terminals 4 and 5 from which leads are taken to the main consumption circuit 6 and 7, the voltage in which is to be kept substantially constant. This consumption circuit contains the usual translating devices, viz. lamps 8 and motors 9, and has connected in parallel branch thereto the usual storage battery 10 which is kept charged by the running of the main generator and which supplies current to the consumption circuit when the train is stationary. An overload and reverse current circiut breaker is indicated at 11 in the main leads from the generator terminals and an overload circuit breaker 12 is indicated in the battery circuit in accordance with common practice.

The excitation field for armature 2 is represented by the coil 13 which is energized from a main exciter 14 comprising two armatures 15 and 16 and a shiftable field coil 17 for said armatures. The armatures 15 and 16 are mounted back to back on the same shaft, either shaft 1 or a countershaft 1a driven therefrom as indicated in Fig. 3, and said armatures are connected in series but wound so as to oppose one another in polarity of current induced therein by the field 17. As will be described in connection with Fig. 3, a centrifugal governor indicated at 19, operated from the prime mover, serves to move the shiftable field coil 17 axially of the armatures 15 and 16 so as to shift its effect gradually from one to the other depending on the speed of shaft 1. At low speed of shaft 1 the field coil 17 will lie over armature 16 for inducing current therein and will have substantially no effect on armature 15 in consequence of which the latter will be at zero potential even though in rotation. As the speed of shaft 1 increases the field coil 17 will gradually move over to produce in armature 15 a gradually increased potential and a decreasing potential in armature 16. As the speed of shaft 1 continues to increase the resultant potential at the terminals 19 and 20 of said armatures 15 and 16 will eventually reach zero and then increase in opposite polarity and of course a reverse action will take place upon the slowing down of shaft 1 from high speed to low speed.

The excitation field of armature 3 is furnished by a field coil 21 also connected to the terminals 19 and 20 of the main exciter 14 and in addition by a self-excited field coil 22 connected in shunt to the main generator terminals 4 and 5. The fact that the direction of current in coils 13 and 21 is at certain times reversed is indicated by a double pointed arrow adjacent these coils and that the direction of current in coil 22 is always the same as indicated by a single pointed arrow. Coil 17 of the main exciter 14 is energized preferably by an outside source of constant E. M. F. and uni-directional current conveniently furnished by a battery such as 23.

I have shown supplemental charging means for the battery 23 which is operated from the prime mover and is designed to function at an approximately uniform charging rate during variations of speed of said prime mover. This charging means comprises a double armature indicated generally at 24 having its armatures 25 and 26 operated from the shaft 1b which is driven from shaft 1, in speed proportion thereto. The armatures 25 and 26, like those of the main exciter 15, 16, are connected in series and wound so as to oppose one another in polarity when under the influence of similar fields. The terminals 27 and 28 of said generator 24 are connected by leads 29 to circuit 30 of battery 23 so as to keep the same fully charged. There is provided in the lead connection 29 the usual overload and reverse current circuit breaker 31 to protect the battery 23.

Armature 25 has an exciting field coil 32 mounted in fixed relation thereto, and armature 26 has an exciting field coil 33 mounted in shiftable relation thereto. This shiftable coil 33 is moved along the axis of the armature 26 by a governor (not shown) operated from shaft 1b so that as the rotational speed of said shaft increases the coil 33 will gradually move from a position where it affects the armature 26 but slightly over to a position in which its flux for said armature is at a maximum. Thus at low speeds of the shaft 1b the current at terminals 27 and 28 will be generated almost solely by armature 25 under the influence of field 32, and as the speed of the shaft increases the voltage from armature 26 will proportionately increase in opposition to that of armature 25 so as to maintain a substantially uniform voltage at the terminals 27 and 28.

The energizing current for the coils 32 and 33 is taken from the battery circuit 30 by leads 34 controlled by a double pole reversing switch 35. Means (not shown) are provided to actuate switch 35 every time shaft 1a reverses in rotational direction so as to reverse the direction of current from battery 23 into said coils 32 and 33. In this manner the terminals 27 and 28 of said generator 24 are maintained at the same polarity irrespective of the direction of rotation of said shaft 1a.

36 is a cut-out switch for the battery 23 designed to be operated by the rotation of shaft 1 in either direction to close the battery circuit and to open the battery circuit when the shaft 1 is stationary in order to avoid waste of current from said battery 23 when the train stops.

Referring to the circuit diagram of Fig. 1, the operation of this system is as follows: The entire speed range of shaft 1 may be considered as having been divided into two brackets, viz. a low speed bracket and a high speed bracket. The various field windings are so designed and proportioned that as shown by the diagram, Fig. 7, in the low speed bracket from 10 M. P. H. of the train up to 60 M. P. H. the voltages generated by the two armatures 2 and 3 are additive in producing the effective voltage at the main terminals 4 and 5 of the generator. During the increase of speed from 10 M. P. H. up to 60 M. P. H. the voltage in armature 2 gradually decreases to zero, while the voltage in armature 3 is gradually increased so that said armature 3 is practically carrying the entire load at 60 M. P. H. Consequently it will be designed to operate at its normal rating and with its greatest efficiency at this speed. As the speed of the train increases beyond 60 M. P. H. the voltage in armature 2 is reversed (by reason of reverse of current in field winding 13 caused by the shift of field coil 17 over to the exciter armature 15). Thereupon the voltage from armature 2 is in opposition to that from armature 3. Likewise the exciter field coil 21 of armature 3 is opposing and cutting down the influence of shunt coil 22 of armature 3 whereby the resulting flux from these differentially acting coils will induce the voltage indicated by line $y$ in the diagram (see Fig. 7). But since the voltage of armature 2 is in opposition to that of armature 3 at this speed as indicated by line $x$ in said diagram, the resulting voltage will be at line $z$ of said diagram. It will be possible by this arrangement and by proper designing and proportion of parts to keep the output voltage of the generator substantially uniform as indicated by said line $z$.

The polarity at the terminals 4 and 5 of the main generator should always remain the same irrespective of the direction of rotation of shaft 1 and this is accomplished by reason of the fact that each time shaft 1 reverses its rotation the current in coils 13 and 21 from exciter 14 is reversed in direction. A pole changing switch 18 included in the shunt circuit of coil 22 is arranged to be operated from a change in rotational direction of shaft 1 so as to reverse the current in said coil 22. Inasmuch therefore as a change in rotation of shaft 1 and said armatures 2 and 3 is accompanied by a change in the direction of the field flux for both armatures, the polarity thereof will be unchanged.

Figure 2:
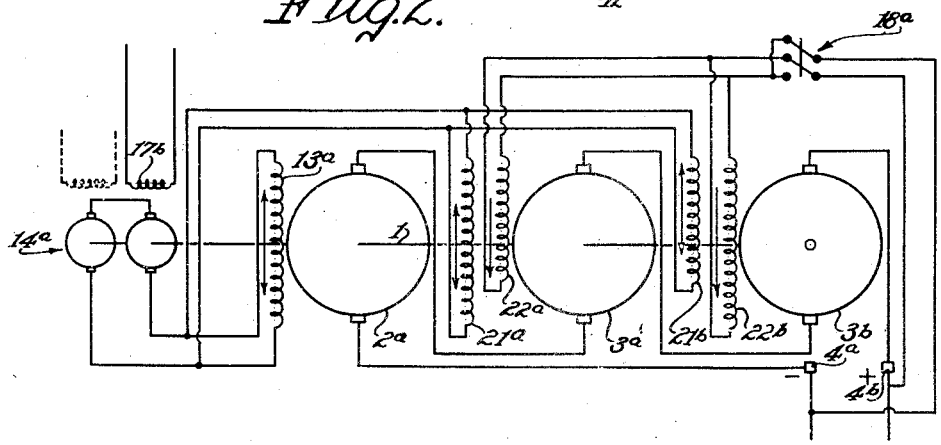
Fig. 2 is a similar view in which three armatures are so employed.

The apparatus illustrated by the diagram in Fig. 2 will operate in much the same manner as that previously described with the exception that in the use of this modified form, the entire speed range of shaft 1 is considered as having been divided into three speed brackets, viz. low speed bracket, medium speed bracket, and high speed bracket, and the main generator has corresponding thereto three armatures 2a, 3a, and 3b operated from the same shaft 1. The field windings for said armatures are designed and proportioned so that each armature will operate at its normal rating in its respective speed bracket.

In the lowest speed bracket all three armatures will generate voltages of the same polarity and said voltages will therefore be additive. In the medium speed bracket, armature 2a will have its polarity reversed so as to oppose the other two armatures. During the increase of prime mover speed in the medium speed bracket coil 21a will gradually suppress coil 22a until at the change into the highest speed bracket, armature 3a may be practically at zero potential and the full load will be carried by the armature 3b. Also at said highest speeds the shunt coil 22b of armature 3b will have its field weakened by the exciter coil 21b and at the same time the voltage in armature 3a may be opposing that of armature 3b if necessary to keep the resulting voltage from increasing during the highest speeds.

Figure 4:
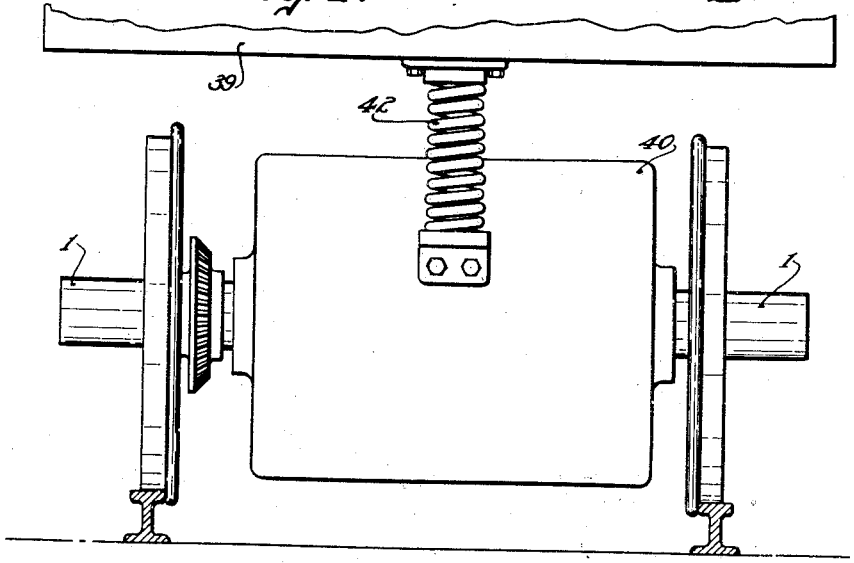
Fig. 4 is a side view of the apparatus shown in Fig. 3.

Referring now to Figs. 3 and 4 of the drawings which show the preferred constructional design of my apparatus, the car axle is shown at 1 and the body of the car at 39. A generator casing 40 is mounted to ride by ball bearings 41 upon the shaft 1 and said casing is kept from rotating with said shaft by means of a suitable connection to the car body such as a coil spring 42. The armatures 2 and 3 of the main generator are fixed to the axle 1 so as to rotate therewith within the casing 40 and the field coils 13, 21 and 22 with their respective field poles are fixed to the stationary casing 40 as shown. It will be understood of course that there will be a plurality of such field coils and field poles distributed around their respective armatures.

Upon one side of the casing 40 is fixedly mounted the casing 43 of the exciter. This casing 43 together with a bearing bracket 38 projecting from the other end of casing 40 serves to support for rotation a countershaft 1a, said countershaft 1a being driven from shaft 1 by suitable gearing 45. A governor casing 44 with an integral projecting sleeve 54 is keyed on shaft 1a for rotation therewith. The armatures 15 and 16 are fixed to the shaft 1a within the casing 43 and the field coils 17 and poles, of which there are four in number distributed around the armature 16 as shown in Fig. 6 are mounted on a cylindrical slider 46. The slider is held against rotation in casing 43 and guided thereon by flange and groove guideways so as to be movable axially of the shaft 1a. The slider has a projecting arm 47 extending through a slot at the upper end of casing 43, said arm being connected by a link 48 to a lever 49 pivoted at 50 from stationary bracket 51. The lever 49 has at its lower end a roller 52 for bearing against slide-plate 53 which is mounted for slidable movement upon the projecting sleeve 54 of the governor casing 44.

The slide-plate 53 is operated from centrifugal governor weights pivotally mounted within the casing 44. As shown more clearly in Fig. 5, the centrifugal governor comprises a plurality of weights such as 55, each one being pivotally mounted as at 56 within a guiding pocket such as 57, formed in the casing 44, there being preferably six of said weights and guiding pockets evenly distributed around the shaft 1a. The weights 55 are fitted snugly within the side walls of the guiding pockets 57 and are guided thereon in their pivotal movement with a minimum of friction. Each of said weights has an arm such as 58 connected by link 59 to the slider plate 53 whereby the in and out movement of said weights under the influence of the shaft speed serves to move the shiftable field coil 13 for functioning as previously described.

While in the foregoing my apparatus has been described as a generator it will be readily understood that its functional operation is reversible in principle and that it may be used as a motor to get wide variations in speed from a power supply of constant potential. For such a use of course the centrifugal governor for operating the exciter field coil will be replaced by a hand control and starter switch. By removing the exciter field coil by hand a very wide range of speed variation of the shaft 1 as a motor shaft may be obtained.

I claim:

1. In an electrical generating system, the combination of two armatures operated from the same rotating shaft adapted to generate currents of opposing polarity and coupled together in series, an exciting field adjacent said armatures, and means for varying the effect of said field by moving it along the axis of said armatures.

2. In an electrical generating system, the combination of two armatures operated from the same rotating shaft adapted to generate currents of opposing polarity and coupled together in series, an exciting field movably mounted adjacent said armatures, and means for shifting said field axially of said armatures.

3. In an electrical generating system, the combination of two armatures operated from the same rotating shaft adapted to generate currents of opposing polarity and coupled together in series, a fixed exciting field for one of said armatures, a movably mounted exciting field for the other armature, and means for shifting said movable exciting field in position axially with respect to its armature.

4. In an electrical generating system, the combination of two armatures operated from the same rotating shaft adapted to generate currents of opposing polarity and coupled together in series, a single exciting field movably mounted adjacent said armatures and adapted to be shifted back and forth axially of said armatures for varying its inducing effect between one or the other of said armatures, and a centrifugal governor operated from said shaft for shifting the position of said exciting field depending upon the rotational speed of said shaft.

5. In an electrical generator system in combination, a main generator having a plurality of armatures in series and rotated from the same shaft, an exciting field coil for each of said armatures adapted to be energized by an outside exciter generator, each of said armatures beyond the first one in the series having a self-excited field coil in differential relation to said outside excited field coil, said outside exciter generator comprising a pair of armatures operated from the aforesaid shaft and wound to oppose one another in polarity when having a current induced therein by the same field, a shiftable field for said last named armature comprising a coil movable axially thereof and a governor operated from the aforesaid shaft for moving said coil.

6. In an electrical generator system in combination, a main generator having a plurality of armatures in series and rotated from the same shaft, an exciting field coil for each of said armatures adapted to be energized by an outside exciter generator, each of said armatures beyond the first one in the series having a self-excited field coil in differential relation to said outside excited field coil, said outside exciter generator comprising a pair of armatures operated from the aforesaid shaft and wound to oppose one another in polarity when having a current induced therein by the same field, a shiftable field for said last named armatures comprising a coil movable axially thereof and a governor operated from the aforesaid shaft for moving said coil, means for supplying uni-directional current under substantially constant voltage for energizing the coil of said shiftable field of the exciter generator, said means comprising a battery and a separate charging generator connected therewith.

7. In an electrical generator system in combination, a main generator having a plurality of armatures in series rotated from the same shaft, an exciting field coil for each of said armatures adapted to be energized by an outside exciter generator, each of said armatures beyond the first one in the series having a self-excited field coil in differential relation to said outside exciter field coil, said outside exciter generator comprising a pair of armatures operated from the aforesaid shaft and wound to oppose one another in polarity when having a current induced therein by the same field, a shiftable field for said last named armatures comprising a coil movable axially thereof and a governor operated from the aforesaid shaft for moving said coil, the direction of current from said exciter generator being reversed when said shiftable field coil moves from one of its armatures to the other.

8. In an electrical generating system, the combination of two armatures operated from the same rotating shaft adapted to generate currents of opposing polarity and coupled together in series, a single exciting field movably mounted adjacent said armatures and adapted to be shifted back and forth axially of said armatures for varying its inducing effect between one or the other of said armatures, and a centrifugal governor comprising a cylindrical casing fixed axially upon said shaft and having therein a plurality of guiding pockets radially disposed around said shaft, each of said pockets having parallel side walls and a pivoted weight member in each pocket guided by said side walls for swinging outwardly in a plane parallel to the axis of said shaft under centrifugal force, an actuating member slidably mounted on said shaft and adapted to operate said shifting field coil, and links connecting said pivoted weight members with said actuating member.

9. In an electrical machine comprising in combination, two armatures on the same rotatable shaft and connected in series, an exciting field for each of said armatures adapted to be energized by an outside exciter generator, each of said armatures beyond the first one in the series having a self-excited field coil in differential relation to said outside excited field coil, said outside exciter generator comprising a pair of armatures operated from the aforesaid shaft and wound to oppose one another in polarity when having a current induced therein by the same field, a shiftable field for said last named armatures comprising a coil movable axially thereof.

10. In an electrical machine comprising in combination, two armatures on the same rotatable shaft and connected in series, an exciting field for each of said armatures adapted to be energized by an outside exciter generator, each of said armatures beyond the first one in the series having a self-excited field coil in differential relation to said outside excited field coil, said outside exciter generator comprising a pair of armatures operated from the aforesaid shaft and wound to oppose one another in polarity when having a current induced therein by the same field, a shiftable field for said last named armatures comprising a coil movable axially thereof, and means for supplying uni-directional current under substantially constant voltage for energizing the coil of said shiftable field of the exciter generator.

EDWARD G. GALLAGHER.